United States Patent [19]
Peng

[11] 4,066,613

[45] Jan. 3, 1978

[54] METHOD OF PREPARING HOMOGENEOUS THERMOSETTING POWDER PAINT COMPOSITIONS

[75] Inventor: Stephen Chung-Suen Peng, Rochester, Mich.

[73] Assignee: Ford Motor Company, Dearborn, Mich.

[21] Appl. No.: 629,160

[22] Filed: Nov. 5, 1975

Related U.S. Application Data

[63] Continuation of Ser. No. 389,845, Aug. 20, 1973, abandoned.

[51] Int. Cl.$^2$ ................................. C08J 3/14
[52] U.S. Cl. ............................ 260/42.54; 260/42.28; 528/502
[58] Field of Search ............... 528/481, 502; 260/34.2, 260/42.54, 830 R, 836, 42.28, 42.29

[56] References Cited

U.S. PATENT DOCUMENTS

| | | | |
|---|---|---|---|
| 3,028,251 | 4/1962 | Nagel | 117/21 |
| 3,485,789 | 12/1969 | Guilbault | 117/21 |
| 3,586,654 | 6/1971 | Lerman | 260/34.2 |
| 3,758,635 | 9/1973 | Labana | 260/836 |
| 3,781,379 | 12/1973 | Theodore | 260/836 |
| 3,787,521 | 1/1974 | Labana | 260/42.54 |
| 3,873,493 | 3/1975 | Labana | 260/34.2 |
| 3,940,453 | 2/1976 | Labana | 260/836 |

*Primary Examiner*—Paul R. Michl
*Attorney, Agent, or Firm*—Roger L. May; Keith L. Zerschling

[57] ABSTRACT

A method of preparing a homogeneous thermosetting powder paint composition which cures to form a coating exhibiting outstanding exterior durability, adhesion, impact strength and, in particular, color match. The method comprises: introducing a liquid paint composition including at least a cross-linkable copolymer and a uniformly dispersed pigment into an evaporating zone adapted to heat said liquid paint so as to evaporate the inert solvent contained therein; passing the liquid paint into a separating zone; causing said solvent vapor to be removed; removing the non-volatile components of said paint in a molten state; cooling said non-volatile components; and pulverizing to form a powder.

22 Claims, 2 Drawing Figures

METHOD OF PREPARING HOMOGENEOUS THERMOSETTING POWDER PAINT COMPOSITIONS

This is a continuation of application Ser. No. 389,845, filed Aug. 20, 1973 and now abandoned.

This application relates to a process for preparing powder paint compositions which are useful for providing protective and decorative surface coatings on a variety of substrates including glass, metal and various other substrates which can withstand the curing temperature of the powder. More particularly, this application is directed to a method for preparing thermosetting powder paint compositions which exhibit a homogeneous character and which cure to form a coating exhibiting outstanding exterior durability, adhesion, impact strength and, in particular, color match.

BACKGROUND OF THE INVENTION

Powder coating compositions for use in painting surfaces have become increasingly desirable in recent years for various reasons including those relating to ecology, health and safety. More particularly, such powder coating compositions have become desirable because they eliminate the solvents utilized in liquid paint systems such as are currently in wide use. The application and drying or curing of such liquid paint compositions, of course, requires that the solvent vehicle be volatilized, thus resulting in solvent escaping into the atmosphere and creating health and safety hazards as well as undesirable pollution problems. Powder coating compositions, on the other hand, are curable by heat in a manner such that little, if any, volatile material is given off to the surrounding environment.

While numerous powder paint compositions have been proposed, coatings formed from such compositions share various problems including low luster, poor color development, poor color matching and poor shading. The problems associated with such coatings are at least in part a result of the processes by which these powders are prepared. Prior art manufacturing methods for producing powder coating materials include ball-milling, Z-blade mixing and extrusion.

Ball milling is the simplest of these three methods. In the manufacture of epoxy based powder coatings, for example, all of the ingredients such as granulated epoxy resin, hardener or curing agent, pigments and additives are loaded into a ceramic lined ball mill. Ceramic grinding media of various size and shape are generally used to grind the materials for ten to fifteen hours to produce a blend. Other types of ball milling can be used to produce a similar blend in a shorter time. This method, however, does not achieve a good dispersion of pigments and other additives, thus resulting in powders which cure to form coatings of exceptionally low gloss and opacity. In addition, such a process does not allow for satisfactory color and shade matching of the coating.

In Z-blade mixing resin is first heated in a Z-blade mixer to at least its melting point and when molten all other ingredients except curing agent are added slowly. In general, dispersion requires about 6 hours after which the temperature of the Z-blade mixer is reduced and curing agent is added. As soon as the curing agent has been adequately mixed, the melt is cooled, pulverized and classified. The compositions formed by this process generally produce coatings having inadequate pigment dispersion and gloss requirements for top coat uses such as for automobiles. As was the case with the ball milling process it is also difficult to obtain adequate color and shade matching with this process. Also, since the process is a batch process, the mill has to be thoroughly cleaned after each run because of the build-up of heat sensitive material.

In the extrusion method, the resin being used is blended with all other ingredients in a high speed mixer and the mixture is then fed into a heated extruder. The extrudate is cooled, pulverized and classified. Although the coatings produced by this method are generally of better quality than those formed from powders made by the above processes, they still, like the others, suffer from lack of flexibility in providing color and shade matching. A still further disadvantage of this process stems from the fact that pigment is dispersed by extrusion, thus requiring slower extrusion rates and possible premature cross-linking due to longer dwell times at elevated temperatures. This premature cross-linking results in a powder which forms coatings having surface imperfections and reduced gloss.

Because of the obvious advantages of powder coatings from the standpoint of ecology, health and safety, it is desirable to produce powders which will form coatings which are commercially acceptable as surface coatings on articles of manufacture such as automobiles. Accordingly, it is the object of this invention to develop a process of preparing thermosetting powder compositions which will upon being heated to a suitable temperature upon a substrate form coatings which exhibit good luster, exterior durability, adhesion and impact strength. It is a further object of this invention to prepare a powder paint composition in such a manner that the powder may be color and shade matched against standards prior to application to a surface.

BRIEF DESCRIPTION OF THE INVENTION

The above objects are accomplished in accordance with this invention by a process of preparing powder compositions of a certain composition which process comprises:

A. introducing a liquid paint composition comprising a solution of:
  1. a copolymer containing cross-linkable functional groups and preferably having a a glass transition temperature ($T_g$) in the range of about 40° C to about 90° C and a number average molecular weight ($\overline{M}_n$) of between 1,000 and about 15,000;
  2. pigment; and
  3. inert solvent into an evaporating zone adapted to heat said solution so as to evaporate said inert solvent;

B. supplying heat to said solution while passing the same through said evaporating zone and maintaining the temperature within said evaporating zone at a level
  1. above the melting point of said copolymer but below the point at which degradation or cross-linking of said copolymer occurs
  2. above the temperature at which said inert solvent begins to vaporize;

C. passing said solution from said evaporating zone into a separating zone and, while maintaining the temperature within said separating zone above the melting point of said copolymer, causing said solvent vapor to be removed and allowing the non-volatile components of said paint composition, including said copolymer, to collect in a molten state;

D. removing said non-valatile components from said separating zone;

E. cooling said non-volatile components to form a solid material; and

F. pulverizing said solid material to form a uniformly pigmented powder.

Further objects and attendant advantages of the invention will become more apparent from the detailed description of the invention when read in conjunction with the accompanying drawing in which:

FIG. 1 shows a schematic diagram of an apparatus suitable for carrying out the invention; and FIG. 2 shows an enlarged partial cross-sectional view of the plate evaporator of FIG. 1.

DETAILED DESCRIPTION OF THE INVENTION

Figure 1:
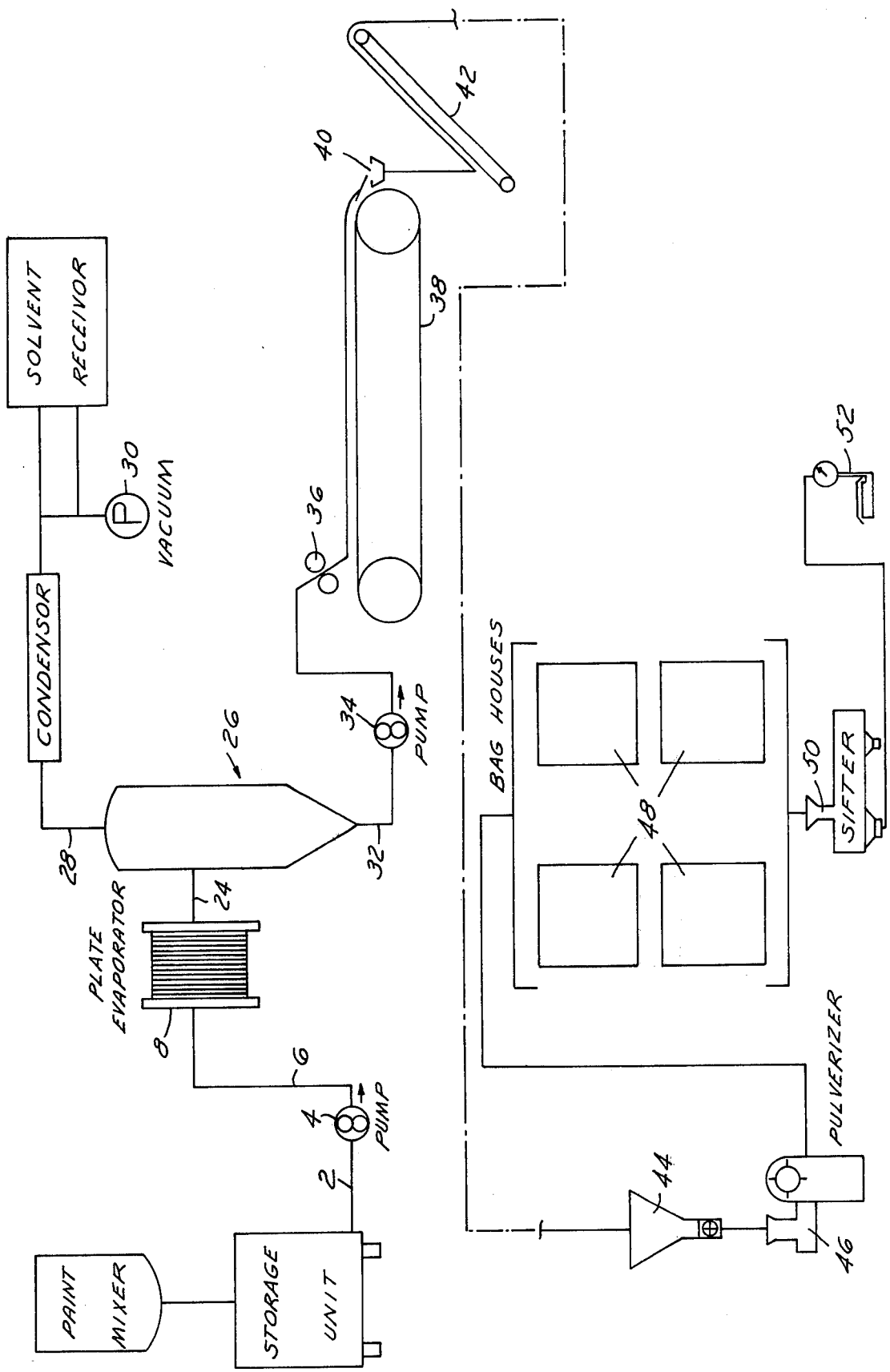

Compositions Useful In the Process of the Invention

The compositions which may be processed in accordance with the method of this invention to prepare thermosetting powder paints are liquid paint compositions containing all or nearly all the ingredients of the desired powder paint dissolved in an inert solvent. The primary component of the composition is a copolymer containing functional groups which will cross-link or cure upon exposure to elevated temperatures. Both copolymers that cross-link with a cross-linking agent and those which cross-link without the need for a cross-linking agent are useful. Preferably the copolymers the liquid paint compositions useful in this process have a glass transition temperature ($T_g$) in the range of 40° C to 90° C and a number average molecular weight ($\overline{M}_n$) of between 1,000 and 15,000. More particularly, the preferred copolymer should have a molecular weight of between about 2000 and about 8500. A preferred glass transition temperature for the copolymer is in the range of 50° C to 80° C with a molecular weight ($\overline{M}_n$) in the range of 3,000 to 6,500. The most preferred glass transition temperature, however, is 60° C to 70° C with a molecular weight ($\overline{M}_n$) in the range of 3,000 to 4,000.

In addition, a pigment should be dispersed in the copolymer solution to form the desired color in the liquid composition. By so dispersing the desired pigmentation in the liquid composition prior to removal of solvent in accordance with the process, it is possible to uniformly and accurately color and shade match the paint prior to reaching the powder state. Thus, the pigmented liquid may be sprayed or otherwise applied to test panels and compared with standard panels for color and shade match in accordance with procedures known to those skilled in the art of color matching liquid paints. If the match is not adequate, additional pigment is easily thoroughly dispersed in the liquid composition. The inclusion and uniform dispersion of pigment in a liquid paint composition which is ultimately converted to a powder paint thus represents a significant advantage of the process of this invention.

In addition to the copolymer and pigment, the copolymer solution may include a flow control agent. Such flow control agents should have a molecular weight ($M_n$) above about 100. Preferably, however the molecular weight ($M_n$) should be above about 1,000 and most preferably between about 6,000 and 20,000. Still further, a cross-linking agent for said copolymer as well as various other additives such as catalysts and antistatic agents may be dispersed or dissolved in the copolymer solution. These materials may, of course, be mixed with uniformly pigmented powder after processing in accordance with this invention if desired. However, the quality of coating obtained from the powder paints is generally greater if these materials are dispersed in the liquid paint composition prior to processing. The reason for the superior results is that the process of the invention effects a much more thorough and uniform dispersion of these additives in the powder than can be effected by mixing subsequently.

Exemplary of the compositions which may be dispersed or dissolved in inert solvent and processed in accordance with the method of this invention to form a powder paint composition is that disclosed in U.S. Pat. Nos.: 3,730,930; 3,758,635; 3,781,379; 3,787,520; 3,758,633; 3,758,634; 3,781,380; 3,758,632; 3,752,870 and 3,787,340 and application Ser. No. 172,223 filed Aug. 16, 1971 and now abandoned. The patent and pending applications teach and claim powder paint compositions, the chemistry of which is preferred for the powders produced by the method of this invention. As mentioned above, the liquid paint compositions which are processed in accordance with the invention include all or nearly all of the components of the desired powder paint. Thus, the chemistry recited in the above-noted patent and applications applies equally to the liquid compositions of this invention, the sole difference being the inclusion of inert solvent in this invention which is ultimately removed. Although the subject matter disclosed in these patents and application may be discussed somewhat hereinafter, the entire disclosures of the patent and applications are incorporated herein by reference.

The copolymers taught by the above-identified patents and application and those preferred for making powder paints in accordance with this invention are preferably formed predominantly from acrylic monomers. The term acrylic monomer as used herein refers to a monomer having a

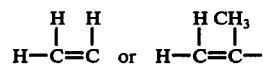

terminal group.

Representative of the copolymers which cross-link without the need for a cross-linking agent are those disclosed in U.S. Pat. Nos. 3,758,632 and 3,787,340. The copolymer of U.S. Pat. No. 3,787,340 has a molecular weight ($\overline{M}_n$) of between about 2,000 and about 15,000 and may contain, for example, (a) ethylenically unsaturated monomers containing approximately stoichiometric quantities of hydroxy functional groups and carboxy functional groups, and (b) ethylenically unsaturated monomers containing no functional groups. The copolymer should contain from about 8% by weight to about 25% by weight of the monomer supplying the hydroxy functional group of the copolymer and between about 5% by weight and about 20% by weight of the monomer supplying the carboxy functionality. The copolymer of U.S. Pat. No. 3,758,632 has a molecular weight ($\overline{M}_n$) of between about 3,000 and about 10,000 and may contain, for example, (a) approximately stoichiometric quantities of functional ethylenically unsaturated monomers, one bearing epoxy functional groups and the other bearing anhydride functional groups and (b) ethylenically unsaturated monomers containing no functional groups. The monomer supplying the epoxy functional groups should be present in the amount of 2–12% by weight of the copolymer and the monomer supplying the anhydride functional groups should be present in the amount of 2–8% by weight of the copolymer.

All of the remaining disclosures except for Ser. No. 172,226 disclose copolymers of glycidyl methacrylate or glycidyl acrylate and various other ethylenically unsaturated monomers without functionality. The epoxy functional monomers in the copolymers should be present in the amount of between about 8 and about 30 weight percent and the copolymers should have a molecular weight ($\overline{M}_n$) of between about 2,500 and about 8,500. The ethylenically unsaturated monomers without functionality include such monomers as methyl methacrylate, butyl methacrylate, butyl acrylate, ethyl acrylate, 2-ethylhexyl acrylate, styrene, alpha-methyl styrene, acrylonitrile and methacrylonitrile.

Various cross-linking agents useful for curing such epoxy functional copolymers are disclosed by the above patent and applications and, briefly enumerated, include: saturated, straight chain, aliphatic dicarboxylic acids; a mixture of saturated, straight chain, aliphatic dicarboxylic acids and saturated, straight chain, aliphatic monocarboxylic acid; diphenols having molecular weights in the range of 110 to 550; carboxy terminated polyesters or epoxy esters; phenol hydroxy terminated resins; anhydrides of dicarboxylic acids; and various compounds containing tertiary nitrogen atoms.

U.S. Pat. No. 3,758,633 discloses a copolymer containing carboxyl functional monomers and other ethylenically unsaturated monomers without functional groups such as those above, the copolymer being cross-linked with an epoxy functional compound.

Of course, it should be appreciated that the details with respect to each of the copolymers discussed above are set forth in the various patent and applications mentioned above. The amount of cross-linking agent admixed with a given amount of copolymer generally is that which is sufficient to provide 0.8 to 1.1 cross-linking functional groups per cross-linking functional group in the copolymer. In any event, the amounts necessary to achieve good cross-linking are set forth in each of the applications and the patent.

The flow control agents disclosed in the above patent and applications may be acrylic polymers having a glass transition temperature below the glass transition temperature of the mixture's copolymer. Preferred acrylic polymers which may be used for the flow control agent are polylauryl acrylate, polybutyl acrylate, poly(2-ethylhexyl acrylate), polylauryl methacrylate and polyisodecyl methacrylate. The flow control agent may also be a fluorinated polymer having a surface tension, at the baking temperature of the powder, lower than that of the copolymer utilized in the mixture. Of course, additional flow control agents exhibiting the above surface tension properties and known to those skilled in the art may be employed.

In general pigment forms from about 3 to about 45% by weight of a powder coating. Pigments disclosed in the above identified patent and applications which are suitable include, but are not limited to, the following: basic lead silico chromate (orange); titanium dioxide (white); titanium dioxide plus ultra marine blue (blue); phthalocyanine blue plus titanium dioxide (blue); phthalocyanine green plus titanium dioxide (green); ferrite yellow plus titanium dioxide (yellow); carbon black (black); black from iron oxide (black); chromium green oxide plus titanium dioxide (green); quindo red plus titanium dioxide (red); and iron oxide transparent orange pigment (orange). The various pigments are generally introduced into liquid paint solutions as mill bases containing concentrated amounts of the pigments dispersed in inert solvent in accordance with procedures well known in the art of preparing liquid paint compositions.

The various types of copolymers useful for forming the liquid paint compositions which may be converted to powders in accordance with the process of this invention may be formed by a variety of techniques known in the art including solution polymerization, emulsion polymerization, suspension polymerization, bulk polymerization, etc. However, solution polymerization techniques are preferred inasmuch as they lend themselves to the most expedient production of powders in accordance with this invention. If solution polymerization is used it is merely necessary to add various additives such as flow control agents, cross-linking agents, pigment selections, etc., directly to the copolymer solution following polymerization. This solution may then be processed directly in accordance with the process hereinafter discussed. This is in contrast to using copolymers formed by other polymerization techniques which require recovering the copolymer and then dissolving it is a suitable solvent. Of course, it follows, that pigment mill bases used to color the liquid paint compositions may be more efficiently prepared if the copolymer is initially formed in solution. Furthermore, it is easier to prepare the low molecular weight copolymers useful in powder coatings by solution polymerization techniques. Numerous inert solvents may be used in carrying out such solution polymerization process and such solvents will be obvious to those skilled in this art. Among the suitable solvents are benzene, toluene, xylene, n-butyl alcohol, iso butyl alcohol, sec butyl alcohol, iso butyl acetate, n-butyl acetate, methyl ethyl ketone, diethyl ketone, methyl isobutyl ketone and methyl n-propyl ketone.

METHOD OF PROCESSING COMPOSITIONS IN ACCORDANCE WITH INVENTION

In accordance with the method of this invention, the liquid paint composition, which preferably comprises at least a copolymer containing cross-linkable functional groups as defined above, a pigment, and a flow control agent dispersed in an inert solvent, is introduced into an apparatus, for converting the liquid paint to a powder. An apparatus exemplary of the many types of evaporating and separating systems which could be used to perform the process of this invention is that disclosed by U.S. Pat. No. 3,073,380. FIG. 1 diagramatically shows a suitable apparatus for carrying out the process and including the evaporating and separating means of the above patent. While the evaporating and separating portions of the apparatus will be discussed in greater detail hereinafter, the disclosure of the above patent is incorporated herein by reference. It will be appreciated, of course, that this disclosure is included merely as an example of a type of apparatus which may be used and is not intended to be limiting.

Referring now to FIG. 1, in accordance with the invention the liquid paint composition is charged to a paint mixer, so indicated, and there agitated to maintain a complete and uniform dispersion of the pigment and various other additives in the liquid composition. From this mixer the liquid composition is charged to a storage unit through a float valve, not shown, with only a sufficient amount of the composition being maintained in the storage unit to allow a continuous feed of material to the remainder of the apparatus. From the storage unit the liquid composition is fed through the feed pipe 2 with a variable speed positive displacement pump 4 to an evaporating zone at a rate which preferably ranges between about 200 pounds and 500 pounds per hour, with the preferred rate of feed being about 400 pounds per hour. As the liquid paint composition is conveyed from the storage unit by the variable speed pump 4, it may be passed through a strainer, not shown, to remove any foreign matter.

After passing through pump 4 the liquid is conveyed through pipe 6 to the evaporating zone which may comprise a plate evaporator indicated generally as 8. While the liquid composition is in the plate evaporator, the inert solvent and other volatile impurities, are evaporated as the composition passes between the plates which form a tortuous passageway. The material passes through the evaporator as a homogeneous mixture of the vapors of the volatile components and dispersed particles of molten polymer.

Figure 2:
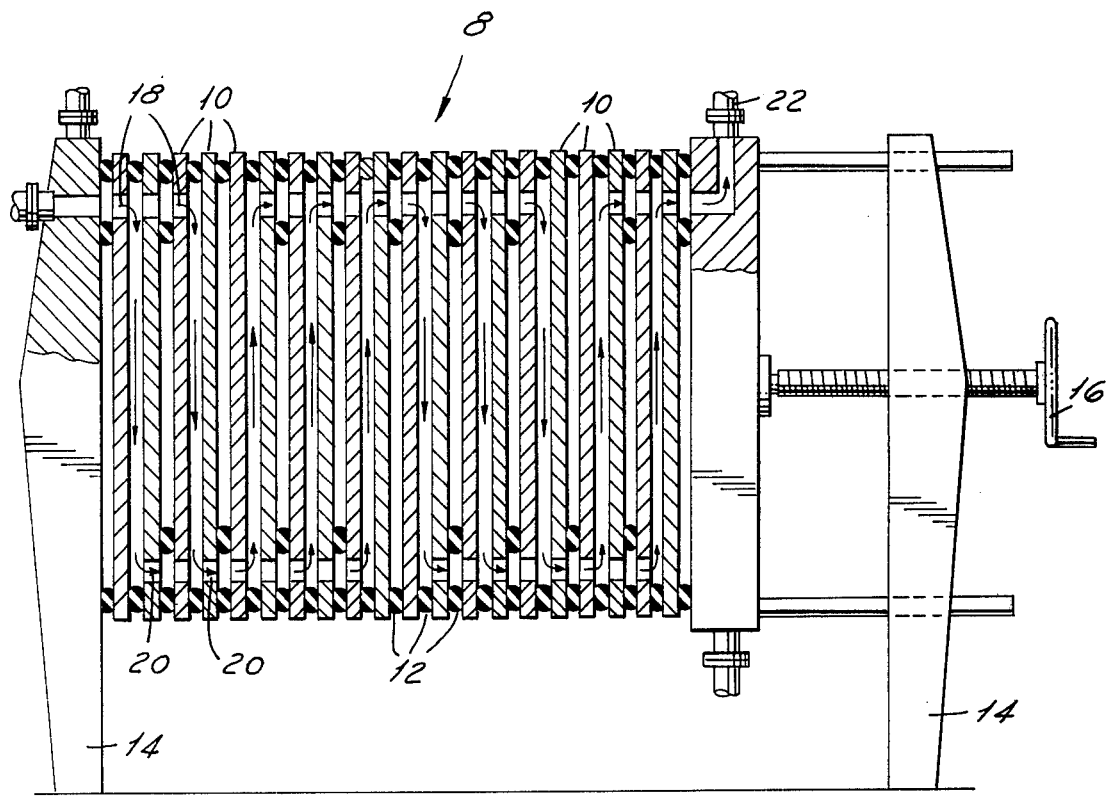

The plate evaporator, the plate arrangement of which is shown in partial cross-section in FIG. 2, comprises a plurality of plates 10 which are arranged in spaced relationship by gaskets 12. The plates are formed as a compact unit in frame 14 by a compression means 16 which compresses the plates against the respective gaskets 12. This arrangement of plates separated by gaskets defines a plurality of spaces therebetween which are in the form of alternate material and heating medium passageways. The first plate of a pair forming a material passageway has an inlet port 18, and the second plate has an outlet port 20. By use of the gaskets 12, alternate spaces are arranged for the flow of the heating medium, such as super heated steam, or the like, which is utilized to effect the heating of the walls of the spaces forming the material passageway. The outlet port in the last plate exits into outlet 22 which is connected to line 24 which conveys the product to the separating zone which may comprise a conical separator generally indicated as 26.

As indicated above, the alternate passageways of the evaporator provide a path for a heating medium, such as super heated steam or other heating medium depending upon the temperature required within the evaporator, so that the liquid paint composition which is passed through the remaining alternate passageways may be heated to a temperature necessary to effect the desired vaporization of volatile components. The heating medium is provided to the evaporator plate heat exchanger from a source not shown and is continually recycled from the evaporating plate heat exchanger to a heater to maintain the necessary temperature. The heating medium should be of such a temperature that it will serve to heat the liquid paint composition to a temperature at a level of (1) above the temperature which the inert solvent of the liquid paint composition begins to vaporize; (2) above the melting point of the copolymer, but below the point at which degradation of the copolymer occurs; and (3) below the temperature at which cross-linking of the polymer occurs. Of course, the temperatures at which the different liquid paint compositions which may be processed according to this method should be run will become apparent to the operator after considering the particular copolymer being employed, the particular inert solvent in which the copolymer is dispersed, the particular cross-linking agent, etc.

Broadly, the liquid paint compositions within the purview of this invention may be processed at a temperature range of between about 140° and about 600° F. Preferably, however, the temperature within the evaporating zone is maintained above about 220° F and more preferably, the temperature is maintained within the range of between about 250° F and about 395° F.

In operation the particular heat evaporator depicted in the drawing is arranged in so-called "material" passes where a gasket held between the upstream face of one plate and the downstream faces of the preceding plate guides the liquid paint composition and generated vapor from the volatile components thereof from an inlet opening at one extremity of one plate to a discharge opening at the opposite extremity of adjacent downstream plate. A "heating pass" is shown where the gasket is held between the upstream face of one plate and the downstream face of the next adjacent plate and guides the heating medium between an inlet opening at one extremity of one plate to an outlet opening at another extremity of the next plate. Thus, the material pass has heat applied on the opposite side of each of the two plates confining it which gives extremely good relationship in heat transfer surface to mass of material in process. Turbulent flow of the liquid paint composition is rapidly induced by its passage through the extremely small cross-sectional area of the passageway as it contacts the relatively large surface through which the heat is passed. Under these conditions the excellent heat transfer causes the temperature of the material to rise rapidly to a point where the vapor is generated. Successive abrupt changes in flow direction are induced as the liquid paint composition comprising now a mixture of molten resinous material and inert solvent vapor passes from one material pass to the next successive material pass. The changes in direction together with the velocity being maintained by control of the passageway cross-section and vapor generation maintain the vapor in intimate mixture with the molten polymer components at all times while the material is within the heating or evaporating zone. This velocity and turbulence insure good heat exchange and cause a high degree of volatilization as well as a complete and uniform mixing of all non-volatile components of the paint composition. The turbulence also almost entirely inhibits the deposition of the solid materials in a manner which normally results from evaporation of a delicate material on a hot surface.

The homogeneous admixture of volatile components and molten polymer components in combination with the various other additives of the paint composition pass through line 24 into the conical separator 26 as indicated above. The conical separator is maintained at such a temperature that the material therein is kept at a temperature above the melting point of the non-volatile components and above the volatilization temperature of the solvent. The conical separator is heated by a jacket, not shown. The separator is also maintained at a reduced pressure of between about 10 and about 500 mm. Hg, preferably between about 20 and about 30 mm. Hg by vacuum pump 30. Since the pipe 24 to the plate evaporator is maintained in an open state, a reduced pressure is also maintained within the plate evaporator 8. This reduced pressure increases the speed with which the material may be passed through the evaporating zone and also effects a more complete vaporization of volatile components. The volatile components of the liquid paint composition are removed from the separator through line 28 and condensed in the condenser, as indicated, before passing into a solvent receiver. The non-volatile components of the liquid paint composition then settle to the bottom of the separator where they are maintained in a molten state due to the heat provided to the separator.

From the separator the molten polymer mixture is withdrawn by means of a variable speed pump 34 through line 32. The material is conveyed through distributing rolls 36 onto a chilled belt 38 where the polymer is cooled below its melting point and forms a solid sheet material. The material falling off the end of the chilled belt is broken by a doctor blade, not shown, and falls onto a conveyor 42. The conveyor 42 carries the material to a hopper 44 through which it falls into a pulverizer 46. The pulverizer 46 grinds the material to the appropriate size for use as a powder paint, e.g., in the range of between about 100 mesh and 400 mesh, and the powder is then conveyed by vacuum to bag houses 48. From the bag houses 48 the material is passed through a sifter 50 for classification according to particle size and is then conveyed to a weighing station 52.

It should be appreciated that, as indicated above, it is within the scope of this invention to employ other apparatus which will accomplish the same steps of the evaporating and separating the various components of the liquid paint composition. It should also be appreciated the various liquid paint compositions other than those specifically defined in the foregoing detailed description may be processed in accordance with this invention. Included in such compositions are those containing epoxies and polyesters as the copolymer as well as other copolymers known to be useful to form powder paints. Further, it should be understood that the following specific examples are presented by way of illustration and not by way of limitation.

EXAMPLE I

A powder paint composition is prepared in the manner set forth below:

PREPARATION OF RESIN SOLUTION A

A reaction flask equipped with a stirrer, thermometer, water condenser and monomer addition funnel is charged with 100 parts by weight of toluene and heated to refluxing temperature of about 110° C. A mixture of 45 parts by weight of methyl methacrylate, 40 parts by weight of butyl methacrylate, 15 parts by weight of glycidyl acrylate and 3 parts by weight of t-butyl peroctoate is added dropwise through the monomer addition funnel over a period of about 3 hours while agitating and keeping the temperature at reflux. Refluxing is then continued for an additional 3 hours after which time the monomers have converted essentially completely to polymer. The resulting resin solution has a Gardner Holdt bubble viscosity of F to H at 25° C.

PREPARATION OF PIGMENT MILLBASE

A titanium dioxide pigment millbase is prepared by sand grinding 60 parts by weight of titanium dioxide, 30 parts by weight of Resin Solution A and 10 parts by weight of toluene to a Hegman fineness of 7.5 plus.

PREPARATION OF PAINT SOLUTION

A white paint solution is prepared by mixing 45 parts by weight of the titanium dioxide pigment millbase with 57 parts by weight of Resin Solution A and 0.3 parts of polylauryl acrylate ($\overline{M}_n = 10,000$) under agitation for 20 minutes.

This white paint solution is color matched to the desired shade of white with traces of colored pigment millbase by repeatedly applying to test panels.

PREPARATION OF POWDER

The above paint solution is charged into a feed tank where it is constantly stirred with an agitator. The solution is then fed through a feed pipe with a variable speed positive displacement pump at a rate of 400 pounds per hour to a plate heat exchanger which is heated with super heated steam at 140 psi so as to maintain a temperature of 340°–350° F. The volatile components of the paint solution, which consist of toluene and small amounts of unreacted monomers and impurities, are vaporized in the plate heat exchanger to form a two fluid flow of a superheated vapor continuous phase of the volatile components and a discontinuous phase of the non-volatile components of the paint solution. The non-volatile components of the paint solution are suspended in the vapor phase and are exposed continuously to new heated surface resulting in an increasingly concentrated liquid.

The mixture of volatile and non-volatile components passes from the plate heat exchanger and into a conical separator which is heated by the same superheated steam as above flowing through a jacket around the separator. The separator is also maintained at a pressure of approximately 30 mm Hg. The volatile components of the mixture are condensed in a water jacket condenser and collected in a receiving tank. The non-volatile components or the product drops out by gravity to the bottom of the separator in the form of a melt. This molten polymer is then pumped to a chilled belt fitted with a distributing roll for quick quenching to solid form. The solid product is removed from the chilled belt by a doctor blade and deposited in a product bin from which it is conveyed to a pulverizer for milling. After milling, the uniformly pigmented powder is charged to a ball mill and 3.5 parts by weight of azelaic acid is added thereto.

COATING OF SUBSTRATES

After mixing the cross linking agent and the pigmented powder thoroughly the powder paint composition is sprayed onto electrically grounded steel panels using an electrostatic powder spray gun operating at 50 KV charging voltage. After spraying, the panel is heated at 175° C for 20 minutes. The paint exhibits good exterior durability, adhesion, impact strength and excellent color match. The same paint composition also exhibits good adhesion on panels of glass, brass, zinc, aluminum, copper and bronze.

EXAMPLE II

The procedure of Example I is repeated with the exception that the cross-linking agent is added to the paint solution prior to introducing the same into the plate heat exchange. 3.5 parts of azelaic acid is dissolved in methanol and this solution is added to the paint solution containing the pigment, flow control agent and copolymer.

The powder paint composition prepared from this paint solution is processed in the same manner as Example I, pulverized and classified by particle size. The powder is applied electrostatically as above to various test panels. The coatings exhibit good exterior durability, adhesion, impact resistance, and color match.

EXAMPLE III

A powder paint composition is prepared in the manner set forth below:

PREPARATION OF RESIN SOLUTION A

A reaction flask equipped with a stirrer, thermometer, water condenser and monomer addition funnel is charged with 100 parts by weight of methyl ethyl ketone and heated to refluxing temperature of about 80° C. A mixture of 42 parts by weight of methyl methacrylate, 18 parts by weight of glycidyl acrylate, 40 parts by weight of butyl methacrylate and 3 parts by weight of t-butyl peroctate is added dropwise through the monomer addition funnel over a period of about 3 hours while agitating and keeping the solvent at reflux. Refluxing is then continued for an additional 3 hours after which time the monomers have converted essentially completely to polymer.

PREPARATION OF PIGMENT MILL BASE

A titanium dioxide pigment mill base is prepared by dispersing 60 parts by weight of titanium dioxide, 30 parts by weight of Resin Solution A and 10 parts by weight of methyl ethyl ketone.

A pastel mill base is prepared by dispersing 10 parts by weight of chromium green oxide with 70 parts of Resin Solution A and 20 parts of methyl ethyl ketone.

PREPARATION OF PAINT SOLUTION

A pastel green paint solution is prepared by mixing 17.8 parts by weight of the titanium dioxide pigment mill base with 69.1 parts by weight of Resin Solution A, 2.7 parts of chromium green oxide mill base and 0.3 parts of polylauryl acrylate ($\overline{M}_n = 10{,}000$) under agitation for 20 minutes.

The green paint solution is applied to test panels and color matched to the desired shade of green with traces of mill base.

PREPARATION OF POWDER

The above paint solution is fed through a plate evaporator as described in Example I at a rate of 400 pounds per hour. The temperature within the plate heat evaporator is maintained at about 250° F. The mixture of vapor and non-volatile components is then fed into a conical separator which is maintained at a pressure of 60 mm Hg where the solvent vapor is removed and the molten polymer allowed to gather in the bottom of the separator. The molten polymer is then cooled and pulverized as per Example I.

After the pulverizing step the uniformly pigmented powder is charged to a ball mill and 3.9 parts by weight of adipic acid is added thereto.

COATING OF SUBSTRATES

After mixing the cross-linking agent and the pigmented powder thoroughly the powder paint composition is sprayed onto electrically grounded steel panels using an electrostatic powder spray gun operating at 50 KV. After spraying, the panel is heated at 170° C for 20 minutes. The paint exhibits good adhesion, good impact, strength and excellent color match. The same paint composition also exhibits good adhesion on panels of glass, brass, zinc, aluminum, copper and bronze.

EXAMPLE IV

The procedure of Example III is repeated with the exception that the cross-linking agent is added to the paint solution prior to introducing the same into the plate heat exchanger. 3.9 parts by weight of adipic acid is dissolved in methanol and this solution is added to the paint solution containing the pigment, flow control agent and copolymer. The powder paint composition prepared from this paint solution is processed in the same manner as Example III, pulverized and classified by particle size. The powder is applied electrostatically as above to various test panels and the coatings exhibit good adhesion, impact strength and color match.

EXAMPLE V

A powder paint composition is prepared in the manner set forth below:

A monomer mixture having the following composition is prepared: glycidyl methacrylate 15% by weight, butyl acrylate 20% by weight and methyl methacrylate 65% by weight. Four weight percent of a catalyst 2,2'-azobis-(2)methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature with only a small fraction of heat supplied from an external heater. After the addition of the monomer mixture is complete, the refluxing is maintained by external heat for 3 additional hours. The polymer has a glass transition temperature of 65° C and a molecular weight ($\overline{M}_n$) of 3,000.

PREPARATION OF THE MILL BASE

A titanium dioxide pigment mill base is prepared by sand grinding 60 parts of titanium dioxide, 30 parts of the above resin solution and 10 parts of toluene.

A blue mill base is prepared by sand grinding 10 parts of blue phthalocyanine pigment with 70 parts of the resin solution and 20 parts of toluene.

PREPARATION OF PAINT SOLUTION

A pastel blue paint solution is prepared by mixing 17.8 parts by weight of titanium dioxide pigment mill base with 69.1 parts of the resin solution, 2.7 parts of the blue mill base, 0.038 parts of triethylene diamine, 0.019 parts of tetraethyl ammonium chloride and 0.76 parts of polylauryl methacrylate ($\overline{M}_n = 6{,}000$).

PREPARATION OF POWDER

The above paint solution is fed through a plate evaporator and separator as in Example I. The molten polymer is cooled, pulverized and then ball milled with 3.54 parts of suberic acid.

COATING OF SUBSTRATES

The above powder composition is sprayed electrostatically on various substrates as per Example I and cured by heating to 150° C for 15 minutes. The coating obtained had good adhesion to steel, glass, brass, zinc, aluminum, copper and bronze. The coatings also exhibit good impact and excellent color match.

EXAMPLE VI

The procedure of Example V is repeated with the exception that the cross-linking agent is added to the paint solution prior to introducing the same into the plate heat exchanger. The powder paint composition prepared from this paint solution is processed in the same manner as Example I, pulverized and classified by particle size. After color matching against standard test panels, the powders are applied to various substrates and heated to 150° C for 15 minutes.

EXAMPLE VII

A powder paint composition is prepared as follows: A monomer mixture having the following composition is prepared: glycidyl methacrylate 15% by weight, methyl methacrylate 45% by weight and butyl methacrylate 40% by weight. Three weight percent of the catalyst AIBN is dissolved in the monomer mixture which is then slowly added to refluxing toluene and processed in the manner set forth in EXAMPLE V to form a copolymer having a glass transition temperature of 53° C and a average molecular weight ($\overline{M}_n$) of 4,000.

A titanium dioxide pigment mill base is prepared by sand grinding 60 parts by weight of titanium dioxide, 30 parts by weight of the above resin solution and 10 parts by weight of toluene.

A white paint solution is prepared by mixing 45 parts by weight of the titanium dioxide pigment mill base with 57 parts by weight of the above resin solution, 0.67 parts by weight of tetrabutyl ammonium bromide, and 0.175 parts by weight of polylauryl acrylate ($\overline{M}_n - 10{,}000$). This white paint solution is applied to test panels and color matched to the desired shade of white with traces of colored pigment mill base.

This paint solution is next processed through the plate heat exchanger and separators discussed in Example I with the exception that the temperature within the evaporating zone is maintained at 450° F and the pressure is maintained at 120 mm Hg in the separator.

The molten paint composition is fed from the separator, cooled and pulverized to form a uniformly pigmented powder. This powder is then charged to ball mill where it is thoroughly mixed with 0.74 parts by weight of lauric acid and 3.17 parts of azelaic acid.

The powder paint composition containing cross-linking agent is electrostatically applied to various substrates which are then heated to 175° C for 20 minutes. The coating composition exhibits good adhesion, impact strength, and color match.

EXAMPLE VIII

The procedure of Example VII is repeated with the exception that the two cross-linking agents (lauric and azelaic acids) are added to the paint solution prior to introducing the same into the plate heat exchanger which is maintained at a temperature of 250° C while the separator is maintained at a pressure of 10 mm Hg.

EXAMPLE IX

A powder paint composition is prepared in the manner set forth below:

The same copolymer as prepared in Example VII is employed in the paint composition of this example. A titanium dioxide pigment mill base is prepared by sand grinding 60 parts of titanium dioxide, 30 parts of the resin solution and 10 parts of toluene. A yellow mill base is prepared by grinding 10 parts of ferrite yellow pigment with 70 parts of resin solution and 20 parts of toluene.

A pastel yellow paint solution is prepared by mixing 17.8 parts by weight of titanium dioxide pigment mill base with 69.1 parts of the resin solution, 2.7 parts of the yellow mill base, 0.076 parts of tetrabutyl ammonium bromide and 0.190 parts of polylauryl acrylate ($\overline{M}_n = 10{,}000$). This paint solution is applied to various test panels and matched for color and shade against standard panels.

The color matched paint solution is next processed to a pulverized powder in accordance with the processing techniques set forth in Example I and the ball milled with 4.58 parts of Bisphenol A. The resulting powder is classified by particle size and applied to an electrically grounded, steel panel by using an electrostatic powder spray gun operating at 50 KV charging voltage. After spraying, the panel is heated at 175° C for 20 minutes. The coating obtained on the panel has good adhesion, impact resistance and color match as well as good resistance to toluene, gasoline, butanone or methanol.

EXAMPLE X

The procedure of Example IX is repeated with the exception that the Bisphenol A is added to the paint solution prior to introducing the same into the plate heat exchanger.

EXAMPLE XI

A powder paint composition is prepared as follows:

A monomer mixture having the following composition is prepared: glycidyl methacrylate 15% by weight, methyl methacrylate 50% by weight and styrene 35% by weight. The monomers are reacted in accordance with the procedure set forth in EXAMPLE V with 3% by weight of the catalyst AIBN being used. The resultant copolymer has a molecular weight of 4500 and a glass transition temperature of 90° C.

A titanium dioxide pigment mill base is prepared by sand grinding 60 parts of titanium dioxide, 30 parts of the above resin solution and 10 parts of toluene. A yellow mill base is prepared by sand grinding 10 parts of ferrite yellow with 70 parts of the resin solution and 20 parts of toluene.

A pastel yellow paint solution is prepared by mixing 17.8 parts of the titanium dioxide pigment mill base with 69.1 parts of the resin solution, 2.7 parts of the yellow mill base, 0.38 parts of tetramethyl ammonium chloride and 0.76 parts of poly(2-ethylhexyl acrylate). This liquid paint composition is color matched by applying to test panels and adjusting color and shade with additional pigment. The solution is then processed in accordance with the procedure set forth in Example 1. The pulverized powder obtained is then ball milled with 14.9 parts by weight of a carboxy terminated cross-linking agent which is prepared as follows: five hundred grams of Epon 1001 (epoxide equivalent 500 g) is charged into a 500 ml stainless steel beaker having a heating mantle. The epoxy resin is heated to 110° C. As the epoxy resin is stirred, 194 grams of azelaic acid is added. After a reaction time of 30 minutes, a homogeneous mixture is obtained. The mixture resin, only semireacted, is poured out into an aluminum pan and cooled. The solid mixture is pulverized to pass through a 100 mesh screen by use of a blender.

The powder paint composition prepared as above is applied to various substrates electrostatically and heated to a temperature of 170° C for a period of 30 minutes. The coatings exhibit good adhesion, impact resistance and color match.

EXAMPLE XII

The procedure of Example XI is repeated with the exception that the carboxy terminated cross-linking agent is added to the paint solution prior to introducing the same into the plate heat exchanger.

EXAMPLE XIII

A powder paint composition is prepared as follows:

The monomers, glycidyl methacrylate 15% by weight, methyl methacrylate 45% by weight and butyl methacrylate 40% by weight are mixed together. Three percent by weight of the catalyst AIBN is dissolved in the monomer mixture. The mixture is slowly added to refluxing sec-butyl alcohol (100 parts) which is stirred vigorously under a nitrogen atmosphere. A condenser is provided at the top of the alcohol container to condense the alcohol vapors and return them to the container. The monomer mixture is added through a regulating valve and the rate of addition is controlled to maintain a reflux temperature with only a small fraction of heat supplied from an external heater. After the addition of the monomer is complete, refluxing is maintained by external heat source for three additional hours. The copolymer formed by such a solution polymerization process has a glass transition temperature of 53° C and a molecular weight ($\overline{M}_n = 4,000$).

A titanium dioxide pigment mill base is prepared by sand grinding 60 parts by weight of titanium dioxide, 30 parts of the above resin solution and 10 parts by weight of sec-butyl alcohol. A paint solution is prepared by mixing 45 parts by weight of the titanium dioxide pigment mill base with 57 parts by weight of the resin solution, 0.076 parts of tetrabutyl ammonium bromide, and 0.175 parts of polylauryl acrylate ($\overline{M}_n = 10,000$). This solution is the processed in accordance with the procedure set forth in Example I with the exception that the temperature within the evaporating zone is maintained at 190° F and pressure in the separator maintained at 25 mm Hg. The pulverized powder is then ball milled with 14.9 parts of a phenolic hydroxy terminated cross-linking agent as discussed in Ser. No. 172,225.

The powder paint composition prepared as above is applied to various substrates and heated to a temperature of 175° C for 20 minutes. The coatings exhibit good adhesion, impact strength and color match.

EXAMPLE XIV

The procedure of Example XIII is repeated with the exception that the cross-linking agent is added to the paint solution prior to introducing the same into the plate heat exchanger.

EXAMPLE XV

A powder paint composition is prepared as follows:

The monomers, 2-hydroxyethyl methacrylate 10% by weight, methacrylic acid 6.7% by weight, methyl methacrylate 43.3% by weight, butyl methacrylate 40% by weight are blended to form a mixture and 4 grams of t-butylperoxypivate initiator is added. One hundred parts by weight of benzene is charged into a one liter flask which is equipped with a dropping funnel, condenser, stirrer, thermometer and nitrogen inlet. The monomer mixture is placed in the dropping funnel. The flask is heated to 80° C to reflux the solvent. While maintaining the reaction temperature at 80° C, the monomer mixture is added in a dropwise fashion over a two hour period. After the addition is complete, the reaction is continued for another two hour period. The contents of the flask are cooled to room temperature.

A titanium dioxide pigment mill base is prepared by blending 60 parts of titanium dioxide, 30 parts of the above resin solution and 10 parts of benzene. A green mill base is prepared by mixing 10 parts of green phthaloycanine pigment with 70 parts of the resin solution and 20 parts of benzene.

A pastel green paint solution is prepared by mixing 17.8 parts by weight of the titanium dioxide pigment mill base with 69.1 parts of the resin solution, 2.7 parts of the green mill base, 7.7 parts of poly(2-ethylhexyl acrylate) ($\overline{M}_n = 9,000$) and 0.38 parts of phosphoric acid. This paint solution is processed in accordance with the procedure set forth in Example I with the exception that the heat in the plate heat exchanger is maintained at 200° F and the pressure in the separator is maintained at 15 mm Hg.

The pulverized powder obtained from this process is applied to various substrates and cured by heating to 175° C for a period of 20 minutes. The coatings obtained show good adhesion, impact resistance and color match.

EXAMPLE XVI

A powder paint composition is prepared as follows:

The following mixture of monomers is prepared: glycidyl methacrylate 5% by weight, methyl methacrylate 55% by weight and butyl methacrylate 40% by weight. Three weight percent of the catalyst AIBN is mixed with the monomers and the entire mixture is dissolved in 100 parts of toluene. The reaction is carried out in accordance with the procedure set forth in Example V and the resultant copolymer has a glass transition temperature of 58° C and a molecular weight of 4,000.

A titanium dioxide pigment mill base is prepared by mixing 60 parts of the resin solution and 10 parts of toluene. A red mill base is prepared by mixing 10 parts of quindo red pigment with 70 parts of the resin solution and 20 parts of toluene.

A red paint solution is prepared by mixing 17.8 parts by weight of titanium dioxide pigment mill base with 69.1 parts of the resin solution, 2.7 parts of the red mill base, 0.76 parts of tetrabutyl ammonium bromide and 0.190 parts of polylauryl acrylate ($\overline{M}_n = 10,000$). This paint solution is sprayed onto test panels and color and shade matched with standard panels. After this matching the solution is processed to a powder form in accordance with the procedure set forth in Example I.

After the solid material has been pulverized to powder form it is charged to a high speed mixer where 2.1 parts of maleic anhydride is blended therewith. This powder paint composition is then electrostatically deposited on various substrates. The coatings exhibit good adhesion, good impact strength and color shade matching.

EXAMPLE XVII

A powder paint composition is prepared as follows:

The following monomers are mixed together: 2-hydroxyethyl methacrylate 15 parts, ethyl acrylate 25 parts, methyl methacrylate 60 parts. To this mixture is added 4 parts of AIBN. A one liter, four-necked flask containing 50 ml of toluene and 50 ml of methyl ethyl ketone is heated to a reflux temperature of 85° C. The monomer mixture is added in dropwise fashion over a period of one and half hours to the reaction mixture which is maintained at 85° C. After the monomer addition is complete, 0.5 grams of AIBN is added and the refluxing is continued for an additional one half hour to complete the polymerization.

A titanium dioxide pigment mill base is prepared by blending 60 parts of titanium dioxide, 30 parts of the above resin solution and 10 parts of toluene.

A white paint solution is prepared by mixing 45 parts by weight of the titanium dioxide mill base, 57 parts of the above resin solution, 0.28 parts of zinc chloride, 0.245 parts of polylauryl acrylate ($\overline{M}_n = 5,000$). This paint solution is mixed thoroughly and applied to test panels for color matching. The paint is then processed to powder in accordance with the procedure set forth in Example I. The powder is then applied by electrostatic spraying to various substrates.

EXAMPLE XYX

A powder paint composition is prepared as follows:

A monomer mixture having the following composition is formed: glycidyl methacrylate 18% by weight, ethyl acrylate 20% by weight, methyl methacrylate 40% by weight and vinyl chloride 22% by weight. The monomer mixture is polymerized in accordance with the procedures set forth in Example V using 2% by weight of the catalyst AIBN as the initiator.

A titanium dioxide pigment mill base is prepared as in the foregoing examples but with the above resin solution. A liquid paint composition prepared by blending 45 parts of the mill base with 57 parts of the above resin solution, 0.035 parts of trimethyl benzyl ammonium chloride and 0.7 parts of poly(2-ethylhexyl acrylate) ($\overline{M}_n = 11,000$). This liquid paint composition is sprayed on test panels and color and shade matched by adding small amounts of colored pigment.

This liquid paint composition is then reduced to powder form by processing in accordance with the procedures set forth in Example I. The resultant powder is charged to a high speed mixer blended with 0.7 parts of N,N-dimethyaniline. This powder is applied to various substrates and heated at 170° C for 15 minutes.

EXAMPLE XX

The procedure of Example XIX is repeated with the exception that the N,N dimethylaniline is added to the liquid paint composition prior to processing to powder.

EXAMPLE XXI

A powder paint composition is prepared as follows:

The following monomer mixture is prepared: methacrylic acid 5% by weight, methyl methacrylate 50% by weight and butyl methacrylate 45% by weight. This monomer mixture is polymerized in accordance with the procedure set forth in Example V with three weight percent of AIBN added as a catalyst.

Titanium dioxide and blue pigment mill bases are prepared as in the foregoing examples but with the above resin solution. A liquid paint composition is prepared by mixing 17.8 parts of the titanium dioxide mill base, 69.1 parts of the resin solution, 2.7 parts of the blue mill base, 0.076 parts of tetrabutyl ammonium bromide and 0.190 parts of polylauryl acrylate ($\overline{M}_n = 10,000$). The copolymer so obtained has a Tg of 53° C and a molecular weight ($\overline{M}_n$) of 4,000. This liquid paint composition is sprayed on test panels and color matched. The liquid is then processed to a powder in accordance with the procedures of Example I with the exception that the temperature in the evaporating zone is maintained at 220° F and the pressure in the separating zone is maintained at 50 mm Hg. The resultant powder is then blended with 9.9 parts of Epon 1001 (see page 4–66 of *Handbook of Epoxy Resins*). The resultant powder paint composition is applied to various substrates and cured by heating to 175° C for 20 minutes.

EXAMPLE XXII

The procedure of Example XXI is repeated with the exception that the Epon 1001 is added prior to converting the liquid paint to a powder.

EXAMPLE XXIII

A powder paint composition is prepared as follows:

The monomers, maleic anhydride 4 parts, styrene 4 parts, glycidyl methacrylate 6 parts, methyl methacrylate 46 parts and butyl methacrylate 40 parts are blended with 3 parts of the initiatory t-butylperoxypivalate 100 parts of benzene is charged into a one liter flask which is equipped with a dropping funnel, condenser, stirrer, thermometer and nitrogen inlet. The monomer mixture is placed in the dropping funnel and the flask is heated to 80° C to reflux. While maintaining the reaction temperature at 80° C, the monomer is added in a dropwise fashion over a two hour period. After the addition is complete, the reaction is continued for another two hours. The contents of the flask is then cooled to room temperature.

A liquid paint solution is formed from this solution by combining 45 parts of a titanium dioxide mill base formed from the resin, 57 parts of the resin solution and 0.105 parts of poly(2-ethylnexyl acrylate) ($\overline{M}_n = 9,000$). This liquid is then processed to powder in accordance with the procedure of Example I with the exception that the temperature is maintained at 300° F. The powder formed is applied to various substrates and cured by heating to 175° C for 20 minutes.

In view of this diclosure, many modifications of this invention will be apparent to those skilled in the art. It is intended that all such modifications which fall within the true scope of this invention be included within the terms of the appended claims.

I claim:

1. A method of preparing a powder paint composition comprising:
   A. passing a liquid paint composition comprising a solution of
      1. a copolymer containing crosslinkable functional groups and having a glass transition temperature in the range of 40° C to 90° C and a number average molecular weight of between about 1,000 and about 15,000;
      2. pigment; and
      3. inert solvent through an evaporating zone comprising a tortuous path of relatively narrow cross-section, elongated in a direction lateral to the direction of flow of said solution through said zone;
   B. heating said solution while it is confined within said evaporating zone to a temperature
      1. above the melting point of said copolymer, but below the point at which degradation occurs;
      2. above the temperature at which said inert solvent begins to vaporize thus inducing turbulent flow of said solution within said evaporating zone and thereby maintaining an intimate homogeneous mixture of the vapors of the volatile components of said solution and dispersed particles of nonvolatile components of said solutios;
- C. passing said homogeneous mixture from said evaporating zone into a separating zone and, while maintaining the temperature within said separating zone above the melting point of said copolymer, causing said solvent vapor to be removed and allowing said nonvolatile components to collect in a molten state;
- D. removing said nonvolatile components from said separating zone;
- E. cooling said nonvolatile components to form a solid material; and
- F. pulverizing said solid material to form a uniformly pigmented powder.

2. A method in accordance with claim 1 wherein said evaporating zone comprises a plate heat exchanger.

3. A method in accordance with claim 1 wherein said evaporating and separating zones are maintained under reduced pressure.

4. A method in accordance with claim 3 wherein said separating zone is maintained at a pressure of from 10 to 500 mm Hg.

5. A method in accordance with claim 1 wherein said liquid paint composition includes a crosslinking agent for said copolymer.

6. A method in accordance with claim 1 wherein a crosslinking agent for said copolymer is blended with said pigmented powder after pulverizing.

7. A method of preparing a powder paint composition comprising:
- A. passing a liquid paint composition comprising a solution of
  1. a copolymer formed from glycidyl acrylate or glycidyl methacrylate and an ethylenically unsaturated monomer in such proportions as to obtain a copolymer with a glass transition temperature in the range of 40° C to 90° C and a number average molecular weight in the range of from 2500 to 8500;
  2. a flow control agent;
  3. pigment; and
  4. inert solvent through an evaporating zone maintained under pressure said evaporating zone comprising a tortuous path of relatively narrow cross-section, elongated in a direction lateral to the direction of flow of said solution through said zone;
- B. heating said solution while it is confined within said evaporating zone to a temperature
  1. above the melting point of said copolymer, but below the point at which degradation occurs;
  2. above the temperature at which said inert solvent begins to vaporize thus inducing turbulent flow of said solution within said evaporating zone and thereby maintaining an intimate homogeneous mixture of the vapors of the volatile components of said solution and dispersed particles of nonvolatile components of said solution;
- C. passing said homogeneous mixture from said evaporating zone into a separating zone which is maintained under reduced pressure and, while maintaining the temperature within said separating zone above the melting point of said copolymer, causing said solvent vapor to be removed and allowing said nonvolatile components to collect in a molten state;
- D. removing said nonvolatile components from said separating zone;
- E. cooling said nonvolatile components to form a solid material; and
- F. pulverizing said solid material to form a uniformly pigmented powder.

8. A method in accordance with claim 7 wherein said evaporating zone comprises a plate heat exchanger.

9. A method in accordance with claim 7 wherein the temperature within said evaporating zone is maintained between about 250° F and about 600° F.

10. A method in accordance with claim 7 wherein said separating zone is maintained at a pressure of 20 to 30 mm Hg.

11. A method in accordance with claim 7 wherein said liquid paint composition includes a crosslinking agent for said copolymer.

12. A method in accordance with claim 7 wherein a crosslinking agent for said copolymer is blended with said pigmented powder after pulverizing.

13. A method in accordance with claim 7 wherein said nonvolatile components are cooled by depositing them on a chilled surface.

14. A method of preparing a powder paint composition comprising:
- A. preparing a copolymer containing crosslinkable functional groups by solution polymerization in an inert solvent, said copolymer having a glass transition temperature of between 40° C and 90° C and a number average molecular weight of between about 1,000 and about 15,000;
- B. introducing a flow control agent;
- C. introducing pigment into said copolymer solution;
- D. passing a solution comprising the ingredients of (A), (B) and (C) into an evaporating zone comprising a tortuous path of relatively narrow cross-section, elongated in a direction lateral to the direction of flow of said solution through said zone;
- E. heating said solution while it is confined within said evaporating zone to a temperature
  1. above the melting point of said copolymer, but below the point at which degradation occurs;
  2. above the temperature at which said inert solvent begins to vaporize, thus inducing turbulent flow of said solution within said evaporating zone and thereby maintaining an intimate homogeneous mixture of the vapors of the volatile components of said solution and dispersed particles of nonvolatile components of said solution;
- F. passing said homogeneous mixture from said evaporating zone into a separating zone and, while maintaining the temperature within said separating zone above the melting point of said copolymer, causing said solvent vapor to be removed and allowing said nonvolatile components to collect in a molten state;
- G. removing said nonvolatile components from said separating zone;
- H. cooling said nonvolatile components to form a uniformly pigmented powder.

15. A method in accordance with claim 14 wherein said evaporating and separating zones are maintained under reduced pressure.

16. A method in accordance with claim 14 wherein said liquid paint composition includes a crosslinking agent for said copolymer.

17. A method in accordance with claim 14 wherein said crosslinking agent for said copolymer is blended with said pigmented powder after pulverizing.

18. A method of preparing a powder paint composition comprising:
- A. polymerizing glycidyl acrylate or glycidyl methacrylate with an ethylenically unsaturated monomer in an inert solvent in such proportions as to obtain a copolymer with a glass transition temperature in the range of 40° C to 90° C and a number average molecular weight in the range of 2500 to 8500;
- B. introducing a flow control agent having a number average molecular weight of at least 100 into said copolymer solution;
- C. introducing pigment into said copolymer solution;
- D. passing a solution comprising the ingredients of (A), (B), and (C) through an evaprating zone comprising a tortuous path of relatively narrow cross-section, elongated in a direction lateral to the direction of flow of said solution through said zone;
- E. heating said solution while it is confined within said evaporating zone to a temperature
  1. above the melting point of said copolymer, but below the point at which degradation occurs;
  2. above the temperature at which said inert solvent begins to vaporize thus inducing turbulent flow of said solution within said evaporating zone and thereby maintaining an intimate homogeneous mixture of the vapors of the volatile components of said solution and the dispersed particles of nonvolatile components of said solution;
- F. passing said homogeneous mixture from said evaporating zone into a separating zone and, while maintaining the temperature within said separating zone at the same level as in (D), causing said solvent vapor to be removed and allowing said nonvolatile components to collect in a molten state;
- G. removing said nonvolatile components from said separating zone;
- H. cooling said nonvolatile components to form a solid material; and
- I. pulverizing said solid material to form a uniformlypigmented powder.

19. A method in accordance with claim 18 wherein said evaporating zone comprises a plate heat exchanger.

20. A method in accordance with claim 18 wherein said evaporating zone and said separating zone are maintained under reduced pressure.

21. A method in accordance with claim 18 wherein said liquid paint composition includes a crosslinking agent for said copolymer.

22. A method in accordance with claim 18 wherein said crosslinking agent for said copolymer is blended with said pigmented powder after pulverizing.

* * * * *